United States Patent [19]

Ishii et al.

[11] Patent Number: 5,710,600
[45] Date of Patent: Jan. 20, 1998

[54] PORTABLE APPARATUS FOR REAL TIME VIDEO DISPLAY OF LOCATION AND FOR PLAYING BACK AUDIO PROGRAM MATERIAL

[75] Inventors: Masayuki Ishii, Kanagawa; Isao Takahashi, Saitama; Hiroyuki Kojima, Tokyo, all of Japan

[73] Assignee: Sony Corporation, Tokyo, Japan

[21] Appl. No.: 439,133

[22] Filed: May 11, 1995

[30] Foreign Application Priority Data

May 12, 1994 [JP] Japan ................... 6-098853

[51] Int. Cl.$^6$ .............................. H04N 5/775; H04N 9/74
[52] U.S. Cl. .................. 348/563; 348/586; 348/730;
348/738; 348/836; 340/995; 340/996; 364/449.5;
386/106; 345/114
[58] Field of Search ........................ 348/563, 564,
348/730, 738, 586, 598, 836, 837, 838;
345/113, 114, 115; 369/32, 47, 48, 54,
58; 358/341, 342; 364/443, 449, 456, 449.1,
449.2, 449.5; 340/989, 990, 995, 996; 386/95,
96, 104–106, 125; H04N 9/74, 5/775

[56] References Cited

U.S. PATENT DOCUMENTS

| | | | |
|---|---|---|---|
| 4,502,123 | 2/1985 | Minami et al. | 364/449 |
| 4,530,009 | 7/1985 | Mizokawa | 348/586 |
| 4,568,981 | 2/1986 | Beaulier | 348/586 |
| 4,698,682 | 10/1987 | Astle | 348/586 |
| 5,101,357 | 3/1992 | Tempelhof | 364/449 |
| 5,157,614 | 10/1992 | Kashiwazaki et al. | 364/443 |
| 5,189,430 | 2/1993 | Yano et al. | 340/995 |
| 5,506,578 | 4/1996 | Kishi et al. | 340/996 |

FOREIGN PATENT DOCUMENTS 0126456  5/1984  European Pat. Off. ......... G01C 21/22

OTHER PUBLICATIONS

"Portable Vehicle Navigation System (NV-1): Its Features and Operability" Oct. 12, 1993 (Oki et al.), pp. 482–485.

Primary Examiner—John K. Peng
Assistant Examiner—Jeffrey S. Murrell
Attorney, Agent, or Firm—Jay H. Maioli

[57] ABSTRACT

A composite electronic apparatus consisting of a video and audio signal processing portion including image displaying circuits for displaying images based on a video signal and sound reproducing circuits for reproducing a sound based on an audio signal, a position detecting portion for conducting positional detection to produce position data representing a detected position, a data reproducing portion operative to read information from a record medium and to reproduce map data or video or audio data on the basis of the information read from the record medium, a data processing portion for causing the position data and the map data to be subjected to predetermined data processing, a video signal transmitting portion operative to produce a video signal for image display on the basis of the position data and the map data subjected to the predetermined data processing and to transmit the video signal for image display to the image displaying circuits so that images displayed by the image displaying circuits, and a cabinet for containing the video and audio signal processing portion, a part of the position detecting portion, the data reproducing portion, the data processing portion and the video signal transmitting portion and for supporting another part of the position detecting portion. The audio data reproduced by the data reproducing portion is selectively applied to sound reproduction by sound reproducing circuits in the video and audio signal processing portion.

22 Claims, 7 Drawing Sheets

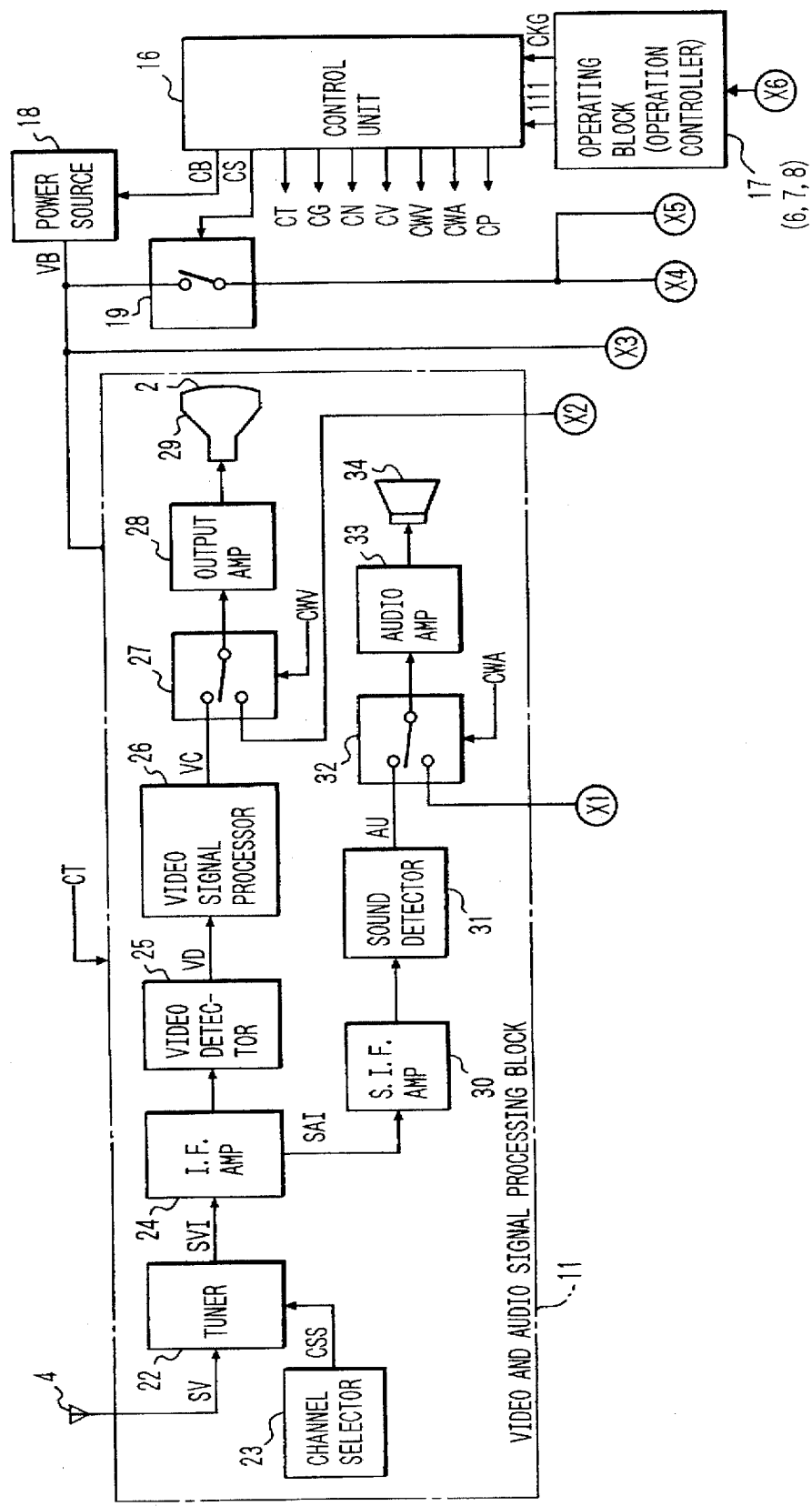

PORTABLE APPARATUS FOR REAL TIME VIDEO DISPLAY OF LOCATION AND FOR PLAYING BACK AUDIO PROGRAM MATERIAL

BACKGROUND OF THE INVENTION

1. Field of the Invention

The present invention generally relates to composite electronic apparatus, and more particularly, to a novel composite electronic apparatus which can be operative to function as a video and audio signal processing apparatus, such as a television receiver, for displaying images based on a video signal and for reproducing a sound based on an audio signal, and operative also to function as a navigation apparatus equipped on an automobile.

2. Description of the Prior Art

There have been proposed various systems for aiding automobiles in running on a road. A navigation apparatus equipped on an automobile has been developed to put one of such automobile aiding systems into practice. Such an automobile navigation apparatus comprises an image Display device which is installed in a cabin of the automobile for displaying images of a road map of the area within which the automobile travels so that the driver or other person in the cabin is able to have visually various information necessary for driving the automobile on the road. The information offered to the driver or other person in the automobile by the automobile navigation apparatus is made by means of displaying successively the present position of the automobile put over the road map images so as to aid the driver or other person in the automobile to grasp travelling conditions or circumstances around the automobile or by means of displaying prearranged or predetermined travelling route put over the road map images so as to reduce the burden on the driver.

In the automobile navigation apparatus thus constituted, the road map information displayed in the figure of road map images by the image display device is stored in a memory device in the form of map data and the map data are read from the memory device as occasion demands. The memory device used for storing the map data is constituted by, for example, an optical disc which is usually called a compact disc (CD) and functions as a read only memory for the reason that such a memory device must have a considerably large memory capacity. Such an optical disc is so called a CD-ROM. The CD-ROM in which the map data are stored is physically the same as an ordinary compact disc in which music information or the like is stored. The only difference between the CD-ROM and the ordinary compact disc resides in kind of information stored therein.

Accordingly, a disc player which comprises a rotary device for rotating a compact disc, an optical head for reading information from the compact disc rotating at a predetermined speed and producing an information signal, and a signal processor for causing the information signal from the optical head to be subjected to predetermined signal processing to obtain reproduced information, is necessitated to read the map data from the CD-ROM in which the road map information is stored in the form of map data in the same manner as reading the music information or the like from the ordinary compact disc. Therefore, the automobile navigation apparatus includes a disc player as one of structural elements thereof. The disc player employed in the automobile navigation apparatus is easily arranged to be used for reading, for example, music information from the ordinary compact disc and reproducing an audio signal based on the music information read from the ordinary compact disc, in addition to primary use for reading the map data from the CD-ROM.

The image display device employed in the automobile navigation apparatus is constituted by a device which is basically the same as a cathode ray tube for image display which is used for display images based on a video signal composing a television signal. Therefore, it is easy to give partial modifications to an ordinary television receiver which has the cathode ray tube for image display so as to be used as the image display device employed in the automobile navigation apparatus for displaying road map images and positions of the automobile or prearranged travelling routes for the automobile put over the road map images, in addition to primary use for displaying the images based on the video signal composing the television signal.

Accordingly, it is desired to obtain a composite electronic apparatus which can be operative to function as a video and audio signal processing apparatus for displaying images based on a video signal and for reproducing a sound based on an audio signal, operative also to function as the automobile navigation apparatus, and operative further to function as the disc player used for reading the map data from the CD-ROM and reading music information or the like from the ordinary compact disc to reproduce the audio signal based on the music information or the like, by incorporating a portable television receiver, which is light and compact, with the automobile navigation apparatus including the disc player. With regard to the composite electronic apparatus thus obtained, it is further desired that a single cabinet is provided for containing all components of the apparatus, so that the apparatus can be easily set in a cabin of an automobile to be used by a person in the cabin and further can be easily and freely carried to some place out of the automobile to be used by a person at the outside of the automobile.

The composite electronic apparatus desired to be constituted with the single cabinet containing all components thereof may comprise, for example, a video and audio signal processing block, a position detecting block, a data reproducing block, a data processing block and a video signal producing block. The video and audio signal processing block is operative to receive a television broadcast signal, to produce video and audio signals based on the television broadcast signal received, and to display images based on the video signal by image displaying means and reproduce a sound based on the audio signal by sound reproducing means, so as to function as a television receiver. The position detecting block is operative to receive an electric wave from an artificial satellite for detecting the receiving position and to produce position data representing the detected position. The data reproducing block is operative to read road map information from a CD-ROM for forming a map information signal and to reproduce map data based on the map information signal when the CD-ROM in which the road map information is stored in the form of map data is attached, and operative to read music information from a compact disc for forming a music information signal, to reproduce control data and audio data based on the music information signal, and to obtain a reproduced audio signal based on the audio data when the compact disc in which the music information is stored is attached. The data processing block is operative to cause the position data obtained from the position detecting block and the map data reproduced by the data reproducing block to be subjected to predetermined data processing. The video signal producing block is operative to produce a video signal for displaying images for navigation on the basis of the data subjected to the data processing in the data processing block or a video signal for displaying audio data reproducing condition on the basis of the control data reproduced by the data reproducing block. The position detecting block, the data reproducing block, the data processing block and the video signal producing block are operative as a whole to function as both the automobile navigation apparatus and the disc player.

The data reproducing block includes a digital circuit for causing the map information signal obtained from the CD-ROM or the music information signal obtained from the compact disc to be subjected to predetermined digital processing when the map data are obtained based on the map information signal or the audio data are obtained based on the music information signal. The data processing block includes also a digital circuit for causing the position data and the map data to be subjected to predetermined digital processing. The sound based on the audio data reproduced by the data reproducing block is selectively reproduced by the sound reproducing means employed in the video and audio signal processing block. The images based on the position data and map data which have been subjected to the data processing in the data processing block are selectively displayed by the image displaying means employed in the video and audio signal processing block.

When the apparatus functions as the automobile navigation apparatus, the video signal for displaying images for navigation which is produced by the video signal producing block is supplied to the image displaying means employed in the video and audio signal processing block, in place of the video signal obtained based on the television broadcast signal, and the images for navigation are displayed by the image displaying means employed in the video and audio signal processing block on the basis of the map data reproduced by the data reproducing block and the position data obtained from the position detecting block.

When the apparatus functions as the disc player to which the compact disc in which music information is stored is attached, the reproduced audio signal obtained in the data reproducing block is supplied to the sound reproducing means employed in the video and audio signal processing block, in place of the audio signal obtained based on the television broadcast signal and the video signal for displaying audio data reproducing condition produced in the video signal producing block is supplied to the video displaying means employed in the video and audio signal processing block, in place of the video signal obtained based on the television broadcast signal. The sound reproducing means employed in the video and audio signal processing block is operative to reproduce a sound based on the audio data obtained in the data reproducing block, and the video displaying means employed in the video and audio signal processing block is operative to display the audio data reproducing condition, which is represented by information reading position on the compact disc or information reading time, on the basis of the control data reproduced by the data reproducing block.

As a matter of fact, there has not been previously proposed any composite electronic apparatus which is operative to function selectively as a video and audio signal processing apparatus, as an automobile navigation apparatus and as a disc player, and is handy to carry, so as to meet the aforementioned requirements.

Then, in the case where such a composite electronic apparatus as described above is considered, a CD-ROM in which read map information is stored in the form of map data is attached to a data reproducing block provided in the apparatus and images far navigation displayed by image displaying means employed in a video and audio signal processing block provided in the apparatus when the apparatus is operated to function as the automobile navigation apparatus, and a compact disc in which music information is stored is attached to the data reproducing block and a sound based an audio data reproduced from the compact disc is reproduced by sound reproducing means employed in the video and audio signal processing block and images representing audio data reproducing condition are displayed by the image displaying means employed in the video and audio signal processing block when the apparatus is operated to function as the disc player.

Under such operations, in the beginning of the period in which the apparatus is operated to function as the automobile navigation apparatus or the disc player, it is judged whether the apparatus functions as the automobile navigation apparatus or the disc player on the strength of an initial picture image displayed By the image displaying means employed in the video and audio signal processing block. Accordingly, it is desired that the initial picture image displayed by the image displaying means employed in the video and audio signal processing block is so designed as to distinguish quite obviously the situation wherein the apparatus functions as the automobile navigation apparatus from the situation wherein the apparatus functions as the disc player.

Further, in the composite electronic apparatus which is operative to function selectively as a video and audio signal processing apparatus, as an automobile navigation apparatus and as a disc player, a power supply voltage is always supplied to the video and audio signal processing block, the position detecting block, the data reproducing block and the data processing block from a power source common to these blocks when the apparatus is put into operation. Therefore, each of the position detecting block, the data reproducing block and the data processing block is maintained to operate even when the video and audio signal processing block operates, for example, to receive a television broadcast signal for producing video and audio signals based on the received television broadcast signal and to display images based on the video signal by the image displaying means therein and reproduce a sound based on the audio signal by the sound reproducing means therein. This means that digital circuits in both the data reproducing block and the data processing block are in operation to generate respective considerably high frequency clock signals when the video and audio signal processing block operates to display images based on the video signal by the image displaying means therein and reproduce a sound based on the audio signal by the sound reproducing means therein.

The clock signals generated by the digital circuits in both the data reproducing block and the data processing block propagate radiately to mix as noises with the video signal or the audio signal in the video and audio signal processing block, and consequently the images displayed by the image displaying means or the sound reproduced by the sound reproducing means in the video and audio signal processing block are disturbed by the noises to be deteriorated in quality.

It is considered to provide a strict shield covering each of the digital circuits in the data reproducing block and the data processing block so as to prevent the clock signals generated by the digital circuits from propagating. In such a case, however, many circuit parts or elements are necessitated for putting each of the digital circuits in the data reproducing block and the data processing block in an effectively shielded condition, so that data reproducing block and the data processing block are complicated in structure and enlarged in scale and further are increased in production cost.

OBJECTS AND SUMMARY OF THE INVENTION

Accordingly, it is an object of the present invention to provide a composite electronic apparatus which can be operated to function selectively as a video and audio signal processing apparatus for displaying images based on a video signal and for reproducing a sound based on an audio signal, as a navigation apparatus equipped on an automobile, and as a disc player used for reading information selectively from both a CD-ROM in which road map information is stored and an ordinary compact disc in which music information or the like is stored, and can be easily and freely set in a cabin of an automobile to be used by a person in the cabin and carried to some place out of the automobile to be used by a person at the outside of the automobile.

Another object of the present invention is to provide a composite electronic apparatus which comprises a video and audio signal processing portion operative to display images based on a video signal by image displaying means and reproduce a sound based on an audio signal by sound reproducing means, and a group of portions operative as a whole to function selectively as an automobile navigation apparatus and as a disc player, which includes a position detecting portion, a data reproducing portion, a data processing portion and a video signal producing portion for producing a video signal for displaying images for navigation or a video signal for displaying audio data reproducing condition, and in which, under the situation wherein a CD-ROM in which road map information is stored is attached to the data reproducing portion and images for navigation are displayed by the image displaying means employed in the video and audio signal processing portion when the group of portions functions as the automobile navigation apparatus, and a compact disc in which music information or the like is stored is attached to the data reproducing portion and a sound based on reproduced audio data is reproduced by the sound displaying means and images representing the audio data reproducing condition are displayed by the image displaying means in the video and audio signal processing portion when the group of portions functions as the disc player, initial picture images which are displayed by the image displaying means employed in the video and audio signal processing portion when the group of portions functions as the automobile navigation apparatus and displayed by the image displaying means employed in the video and audio signal processing portion when the group of blocks functions as the disc player, respectively, are so designed as to distinguish quite obviously the situation wherein the group of blocks functions as the automobile navigation apparatus from the situation wherein the group of portions functions as the disc player.

A further object of the present invention is to provide a composite electronic apparatus which comprises a video and audio signal processing portion operative to display images based on a video signal and reproduce a sound based on an audio signal, so as to function as a television receiver, and a group of portions operative as a whole to function selectively as an automobile navigation apparatus and as a disc player, which includes a position detecting portion for detecting the position of the apparatus and producing position data representing the detected position, a data reproducing portion for reading information from a CD-ROM or a compact disc to form an information signal and reproducing map data or video or audio data by causing the information signal to be subjected to predetermined digital processing and a data processing portion for causing the position data obtained from the position detecting portion and the map data reproduced by the data reproducing portion to be subjected to predetermined data processing, and in which the images displayed by the image displaying means and the sound reproduced by the sound reproducing means in the video and audio signal processing portion are surely prevented from being disturbed by noises propagated from the data reproducing block and the data processing portion, without raising the problems that the data reproducing portion and the data processing portion are complicated in structure and enlarged in scale and further are increased in production cost, when the video and audio signal processing portion operates to display images based on a video signal supplied from the outside and reproduce a sound based on an audio signal supplied from the outside.

According to the present invention, there is provided a composite electronic apparatus comprising a video and audio signal processing portion including image displaying means for displaying images based on a video signal and sound reproducing means for reproducing a sound based on an audio signal; a position detecting portion including an antenna for receiving a positional. Information signal from an artificial satellite, a positional information signal processor for causing the positional information signal received by the antenna to be subjected to a predetermined signal processing, and a detecting unit operative to conduct positional detection based on an output signal from the positional information signal processor and to produce position data representing a detected position; a data reproducing portion operative to read information from a record medium on which the information is recorded and to form an information signal representing the information read from the record medium and further operative to reproduce map data or video or audio data based on the information signal; a data processing portion operative to cause the position data obtained from the position detecting portion and the map data reproduced by the data reproducing portion to be subjected to predetermined data processing; a video signal transmitting portion operative to produce a video signal for image display on the basis of the position data and the map data subjected to the predetermined data processing in the data processing portion and to transmit the video signal for image display to the image displaying means in the video and audio signal processing portion so as to cause the image displaying means to display images based on the video signal for image display; and a cabinet in which the video and audio signal processing portion, a part of the position detecting portion, the data reproducing portion, the data processing portion and the video signal transmitting portion are contained and by which another part of the position detecting portion is supported.

There is provided, in accordance with the present invention, another composite electronic apparatus comprising a video and audio signal processing portion including image displaying means for displaying images based an a video signal and sound reproducing means for reproducing a sound based on an audio signal; a position detecting portion for conducting positional detection to produce position data representing a detected position; a data reproducing portion operative to read information from a record medium on which the information is recorded and to form an information signal representing the information read from the record medium, operative to reproduce identification data, control information data and map data representing map information or audio data based or the information signal, and operative further to produce a first display data on the basis of the control information data under a predetermined condition; a data processing portion operative to cause the position data obtained from the position detecting portion and the map data obtained from the data reproducing portion to be subjected to predetermined data processing so as to produce a second display data; a video signal generator for producing a first video signal based on the first display data obtained from the data reproducing portion or a second video signal based on the second display data obtained from the data processing portion; a background video signal generator for producing selectively different background video signals under a first condition in which the first video signal is obtained from the video signal generator and a second condition in which the second video signal is obtained from the video signal generator, respectively, in response to the contents of the identification data obtained in the data reproducing portion; and a signal supplying portion for supplying the image displaying means in the video and audio signal processing portion with the background video signal obtained from the background video signal generator alone or together with the first or second video signal.

There is provided, in accordance with the present invention, a further composite electronic apparatus comprising a video and audio signal processing portion operative simultaneously or selectively to display images based on a video signal and to reproduce a sound based on an audio signal; a position detecting portion for conducting positional detection to produce position data representing a detected position; a data reproducing portion operative to read information from a record medium on which the information is recorded and to form an information signal representing the information read from the record medium and operative further to cause the information signal to be subjected to predetermined digital processing so as to reproduce map data representing map information or video or audio data; a data processing portion operative to cause the position data obtained from the position detecting portion and the map data obtained from the data reproducing portion to be subjected to predetermined digital processing; a power source for supplying the video and audio signal processing portion, the position detecting portion, the data reproducing portion and the data processing portion with a power supply voltage; and a power supply control portion operative to prevent the power supply voltage from the power source from being supplied to the data reproducing portion and the data processing portion in order to keep the data reproducing portion and the data processing portion inoperative when the video and audio signal processing portion is supplied with the power supply voltage from the power source to display images based on a video signal supplied from the outside and reproduce a sound based on an audio signal supplied from the outside.

In a first composite electronic apparatus constituted as described above in accordance with the present invention, the position detecting portion including the detecting unit, the data reproducing portion, the data processing portion, the video signal transmitting portion and the image displaying means in the video and audio signal processing portion are operative as a whole to function as a navigation apparatus equipped on an automobile and the data reproducing portion is operative also to function as a disc player used for reading information selectively from both a CD-ROM in which road map information is stored and an ordinary compact disc in which music information or the like is stored. The video and audio signal processing portion, the part of the position detecting portion, the data reproducing portion, the data processing portion and the video signal transmitting portion are contained in the cabinet and another part of the position detecting portion is supported by the cabinet, so that the video and audio signal processing portion, the position detecting portion, the data reproducing portion, the data processing portion and the video signal transmitting portion are incorporated to be compact.

Accordingly, the first composite electronic apparatus according to the present invention which is operative to function selectively as the video and audio signal processing apparatus for displaying images based on a video signal and for reproducing a sound based on an audio signal as the navigation apparatus equipped on an automobile, and as the disc player used for reading information selectively from both a CD-ROM in which road map information is stored and an ordinary compact disc in which music information or the like is stored can be easily and freely set in a cabin of an automobile to be used by a person in the cabin and carried to some place out of the automobile to be used by a person at the outside of the automobile.

In a second composite electronic apparatus constituted as described above in accordance with the present invention, the first condition in which the first video signal is obtained from the video signal generator corresponds to a condition in which the apparatus functions as a disc player and the second condition in which the second video signal is obtained from the video signal generator corresponds to a condition in which the apparatus functions as a navigation apparatus equipped on an automobile. Each of these first and second conditions is selectively detected in the strength of the contents of the identification data obtained from the data reproducing portion. For example, data called "Table of Content" (TOC) and recorded on both a CD-ROM and an ordinary compact disc are used as the identification data.

The image displaying means in the video and audio signal processing portion is supplied with the first video signal to display images representing an audio data reproducing condition when the first video signal is obtained from the video signal generator and supplied with the second video signal to display images for navigation when the second video signal is obtained from the video signal generator. Under such a situation, the background video signal generator is operative to produce selectively different background video signals in the first condition and the second condition, respectively. The background video signal thus obtained from the background video signal generator is supplied to the image displaying means in the video and audio signal processing portion alone or together with the first or second video signal.

Consequently, initial picture images which are displayed by the image displaying means employed in the video and audio signal processing portion when the apparatus functions as the disc player and the images representing the audio data reproducing condition are displayed by the image displaying mean and the apparatus functions as the automobile navigation apparatus and the images for navigation are displayed by the image displaying mean, respectively, are different from each other, for example, in color in response to the background video signals. This means that a situation wherein, the apparatus functions as the disc player is distinguished quite obviously from a situation wherein the apparatus functions as the automobile navigation apparatus based on the initial picture images displayed by the image displaying means employed in the video and audio signal processing portion.

In a third composite electronic apparatus constituted as described above in accordance with the present invention, the data reproducing portion and the data processing portion are not supplied with the power supply voltage from the power source to be kept inoperative when the video and audio signal processing portion is supplied with the power supply voltage from the power source to display the images based on the video signal supplied from the outside and reproduce the sound based on the audio signal supplied from the outside. Accordingly, since a digital circuit contained in the data reproducing portion for causing the information signal obtained from the record medium to be subjected to predetermined digital processing and a digital circuit contained in the data processing portion for causing the position data and the map data to be subjected to predetermined digital processing are kept inoperative, no signal which is generated by the digital circuits in both the data reproducing portion and the data processing portion to mix as noises with the video signal or the audio signal in the video and audio signal processing portion propagates radiately and consequently the images displayed by the image displaying means in the video and audio signal processing portion on the basis of the video signal supplied from the outside and the sound reproduced by the sound reproducing means in the video and audio signal processing portion on the bests of the audio signal supplied from the outside are surely prevented from being disturbed by noises propagated from the data reproducing portion and the data processing potion, without raising the problems that the data reproducing portion and the data processing portion are complicated in structure and enlarged in scale and further are increased in production cost. Further, power consumption in the apparatus is effectively reduced when the video and audio signal processing portion is supplied with the power supply voltage from the power source to display the images based on the video signal supplied from the outside and reproduce the sound based on the audio signal supplied from the outside.

The above, and other objects, features and advantages of the present invention will become apparent from the following detailed description taken in conjunction with the accompanying drawings.

BRIEF DESCRIPTION OF THE DRAWINGS

FIGS. 2A and 2B are block diagrams showing an embodiment of composite electronic apparatus according to the present invention;

DESCRIPTION OF THE PREFERRED EMBODIMENT

Figure 1:
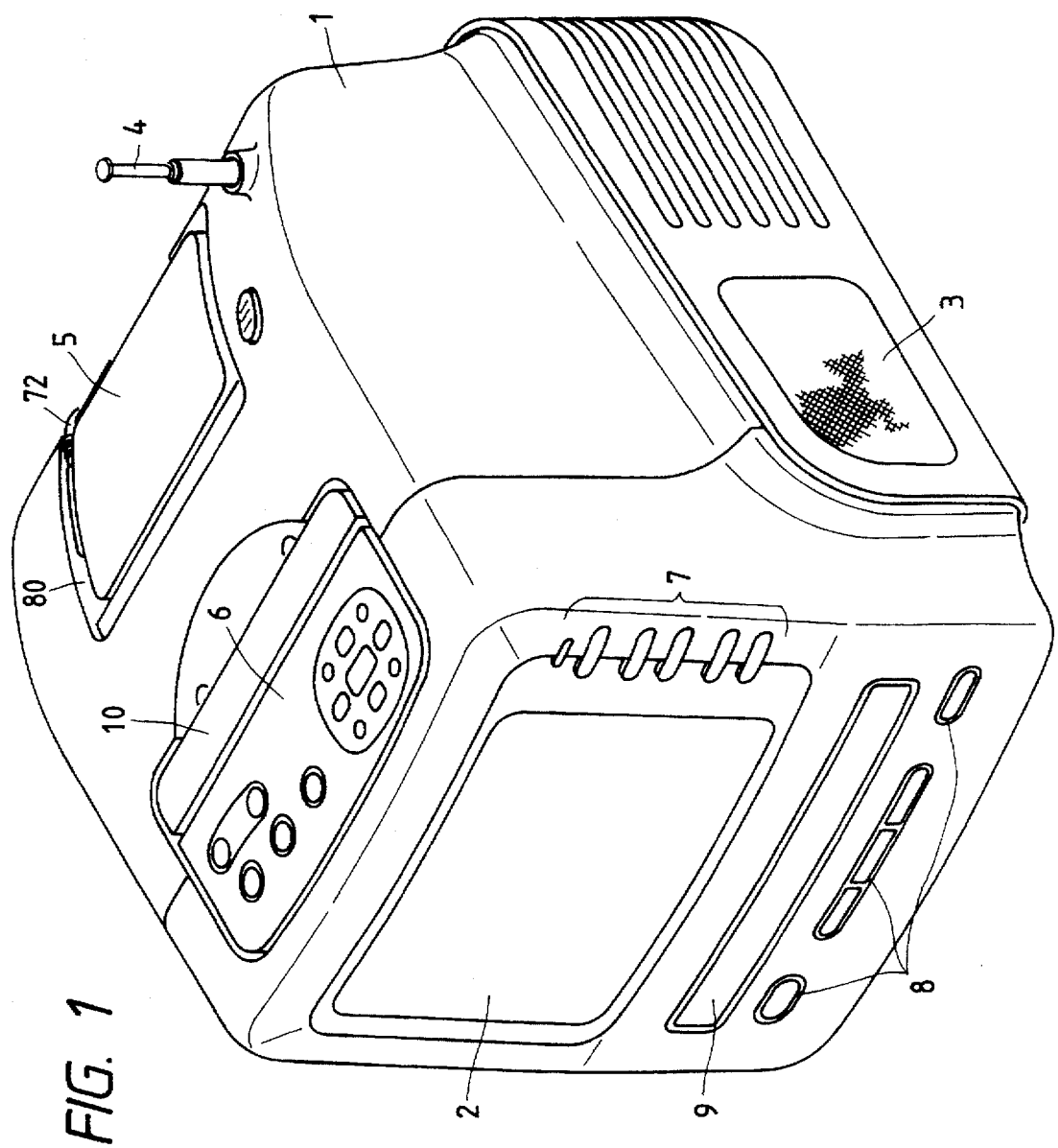
FIG. 1 is a perspective view showing the external appearance of an embodiment of composite electronic apparatus according to the present invention.

FIG. 1 shows the external appearance of an embodiment of composite electronic apparatus according to the present invention. This embodiment is selectively placed in a cabin of an automobile to be used by a person in the cabin and carried to some place out of the automobile to be used by a person at the outside of the automobile.

Referring to FIG. 1, the embodiment has a cabinet 1 formed in the shape of cube-like box. An image displaying screen 2 is provided on the front of the cabinet 1 and a sounding portion 3 to which a speaker is faced from the inside is provided on the side of the cabinet 1. On the top of the cabinet 1, a television antenna 4 for receiving television broadcast signals is mounted and a global positioning system (GPS) signal receiving block 5 containing a GPS antenna for receiving GPS signals which are positional information signals transmitted from artificial satellites employed in the GPS and a GPS signal processor for causing the GPS signals received through the GPS antenna to be subjected to a predetermined signal processing is supported to be detachable to the cabinet 1. Further, a manual control portion 6 at which a plurality of control buttons provided to be manipulated for various control operations is positioned in front of television antenna 4 and the GPS signal receiving block 5 on the top of the cabinet 1.

On the front of the cabinet 1, another manual control portion 7 at which a plurality of control buttons provided to be manipulated for various control operations is positioned on the side of the image displaying screen 2 and a further manual control portion 8 at which a plurality of control buttons provided to be manipulated for various control operations is also positioned below the image displaying screen 2. An opening 9 with a movable cover through which a CD-ROM or a compact disc is put into the cabinet 1 to be supported by a disc rotating portion contained in the cabinet 1 and ejected to the outside of the cabinet 1 from the disc rotating portion, is provided between the image displaying screen 2 and the manual control portion 8. Besides, a handle 10 is provided on the top of the cabinet i to be used for carry the embodiment of apparatus.

Figure 2B:
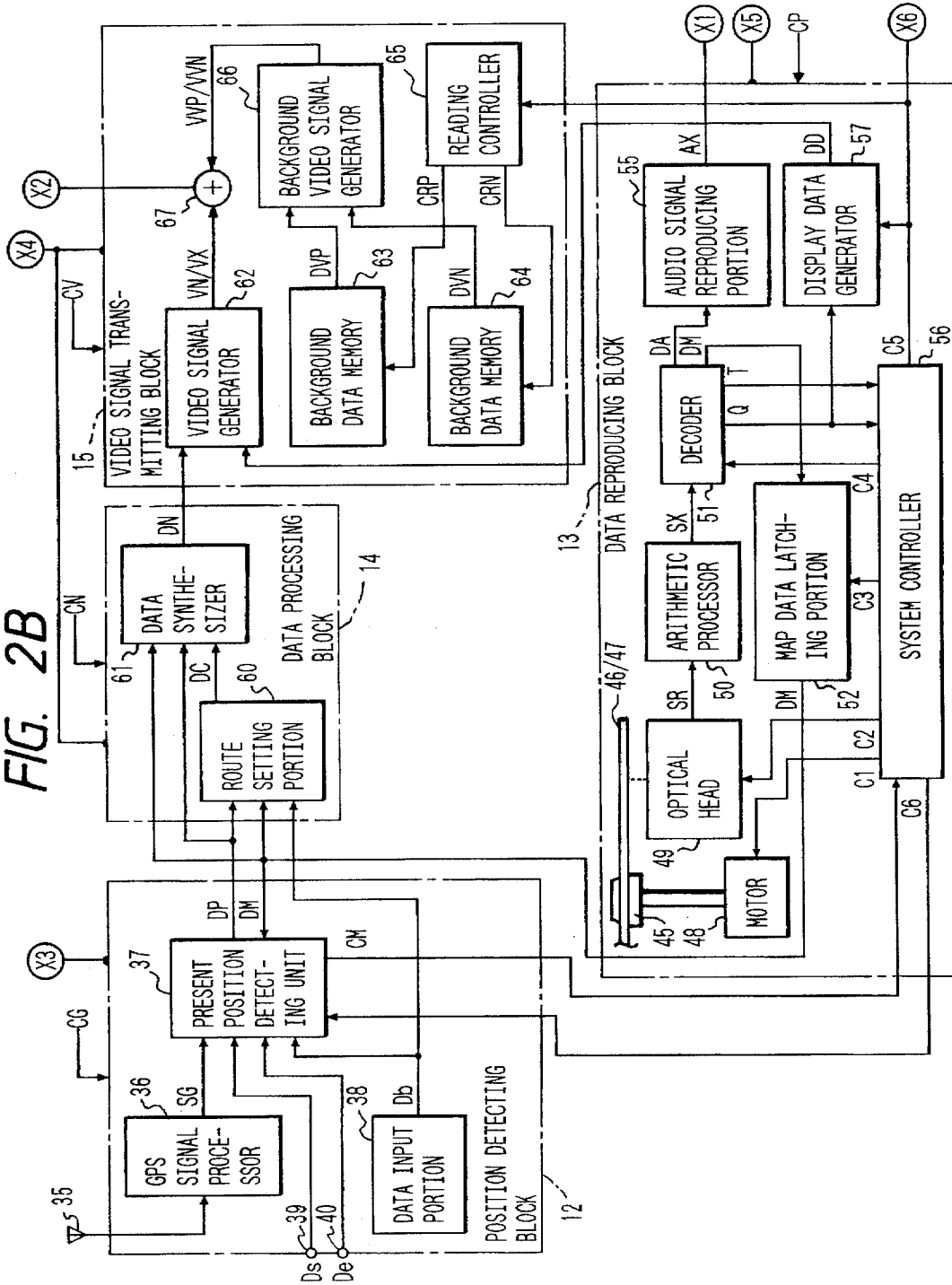

The embodiment of composite electronic apparatus according to the present invention and having the external appearance as shown in FIG. 1 comprises, as shown FIGS. 2A and 2B, a video and audio signal processing block 11 connected to the television antenna 4 to be operative to display images based on a video signal and to reproduce a sound based on an audio signal, a position detecting block 12 connected to a GPS antenna 35 to be operative to receive the GPS signals from the artificial satellite and to detect the present position of the embodiment on the strength of the GPS signals received through the GPS antenna 35 and further operative to produce position data representing the detected present position, a data reproducing block 13 put selectively in a first operating state for reading road map information from a CD-ROM on which the road map information is recorded to form a first information signal representing the road map information read from the CD-ROM and for reproducing identification data, control information data and map data on the basis of the first information signal and in a second operating state for reading music information or the like from a compact disc on which the music information or the like is recorded to form a second information signal representing the music information or the like read from the compact disc, for reproducing identification data, control information data and map data on the basis of the second information signal and for producing a first display data on the basis of the control information data under a predetermined condition, a data processing block 14 operative to cause the position data obtained from the position detecting block 12 and the map data reproduced by the data reproducing block 13 to be subjected to predetermined data processing so as to produce a second display data, a video signal transmitting block 15 operative to transmit a video signal for display produced on the basis of the first display data obtained from the data reproducing block 13 or the second display data obtained from the data processing block 14, a power source 18 for supplying the video and audio signal processing block 11, the position detecting block 12, the data reproducing block 13, the data processing block 14 and the video signal transmitting block 15 with a power supply voltage VB, a switch 19 provided in a voltage supplying line from the power source 18 to each of the data reproducing block 13, the data processing block 14 and the video signal transmitting block 15, a control unit 16 operative to perform comprehensive operation control to the video and audio signal processing block 11, the position detecting block 12, the data reproducing block 13, the data processing block 14, the video signal transmitting block 15 the power source 18 and the switch 19 and an operating block 17 connected to the control unit 16 for supplying the same with operation control signals.

The video and audio signal processing block 11 functions substantially as a television receiver. In such a video and audio signal processing block 11, television broadcast signals SV received by the television antenna 4 are supplied to a tuner 22. In the tuner 22, one of the television broadcast signals SV is selected in accordance with a channel selection control signal CSS from a channel selector 23 and the selected television broadcast signal SV is subjected to high frequency amplification and then to frequency conversion to produce intermediate frequency (IF) signal SVI.

The IF signal SVI obtained from the tuner 22 is supplied to an IF amplifier 24 to be amplified and then supplied to a video detector 25. In the video detector 25, the IF signal SVI is subjected to video signal demodulation to produce a video signal VD. The video signal VD detected by the video detector 25 is supplied to a video signal processor 26 in which a chrominance signal contained in the video signal VD is subjected to demodulation processing to produce a color signal and the color signal is mixed again with a luminance signal contained in the video signal VO to produce a modified video signal VC for image display.

The modified video signal VC for image display obtained from the video signal processor 26 is supplied through a switch 27 and an output amplifier 28 to an image displaying cathode ray tube 29, a front portion of which forms the image displaying screen 2 and picture images based on the modified video signal VC for image display are displayed on the image displaying screen 2. That is, the images based on the modified video signal VC which is produced from the television broadcast signal SV received through the television antenna 4 and the tuner 22 is displayed by the image displaying cathode ray tube 29 functioning as image displaying means.

A sound IF signal SAI separated from the intermediate frequency signal SVI is also derived from the IF amplifier 24 to be supplied to a sound intermediate frequency amplifier 30. The sound intermediate frequency signal SAI amplified by the sound intermediate frequency amplifier 30 is supplied to a sound detector 31 and subjected to sound signal demodulation in the sound detector 31 to produce an audio signal AU.

The audio signal AU obtained from the sound detector 31 is supplied through a switch 32 and an audio amplifier 33 to a speaker 34 and a sound based on the audio signal AU is obtained from the speaker 34. That is, the sound based on the audio signal AU which is produced from the television broadcast signal SV received through the television antenna 4 and the tuner 22 is reproduced by the speaker 34 functioning as sound reproducing means.

In the position detecting block 12, the GPS signal processor 36, which is contained in the GPS signal receiving block 5 together with the GPS antenna 35, is provided. The GPS signal received through the GPS antenna 35 is subjected to the predetermined signal processing in the GPS signal processor 36 to produce a GPS output signal SG. This GPS output signal SG is supplied to a present position detecting unit 37.

Input position data Db from a data input portion 38 are supplied to the present position detecting unit 37 in addition to the GPS output signal SG from the GPS signal processor 36 as occasion demands. Further, map data DM representing a road map and obtained from the data reproducing block 13 in response to reading control signal CM sent out of the present position detecting unit 37 are also supplied to the present position detecting unit 37, in the present position detecting unit 37, the present position at which the embodiment as shown in FIG. 1 is placed is detected as a position on the road map represented by the map data DM on the basis of the GPS output signal SG from the GPS signal processor 36 and the map data DM obtained from the data reproducing block 13, and present position data DP representing the detected present position are produced. The present position data DP are sent out of the present position detecting unit 37 as a detection output of the position detecting block 12.

The present position detecting unit 37 is connected with signal input terminals 39 and 40 through which a detection output signal Ds obtained from a speed sensor employed in an automobile and representing a travelling speed of the automobile and a detection output signal De obtained from a terrestrial magnetism sensor employed in the automobile and representing a travelling direction of the automobile are supplied, respectively, when the embodiment is placed in a cabin of the automobile. Under the condition in which the detection output signal Ds obtained from the speed sensor and the detection output signal be obtained from the terrestrial magnetism sensor are supplied the signal input terminals 39 and 40, respectively, the detection output signal Ds and the detection output signal De are introduced to the present position detecting unit 37 and the input position data Db from the data input portion 38 are also supplied to the present position detecting unit 37 as standard position data. In the present position detecting unit 37 to which the input position data Db from the data input portion 38 functioning as standard position data, the detection output signal Ds from the speed sensor and the detection output signal De from the terrestrial magnetism sensor are supplied in addition to the GPS output signal SG from the GPS signal processor 36 and the mad data DM obtained from the data reproducing block 13, the present position of the automobile is automatically detected successively in response to travelling of the automobile as positions on the road map represented by the map data DM and the present position data DP are produced to represent the detected present position of the automobile on which the embodiment as shown in FIG. 1 is equipped.

The data reproducing block 13 constitutes substantially a disc player used for reproducing information from a compact disc which is a kind of optical disc. In the data reproducing block 13, a CD-ROM 46 in which road map information is stored or an ordinary compact disc 47 in which music information or the like is stored which is inserted through the opening 9 into the cabinet 1, is put on a disc rotating table 45. The CD-ROM 46 or the compact disc 47 put on the disc rotating table 45 is rotated at a predetermined rotating speed by a motor 48 and the road map information or the music information or the like is read by an optical head 49 from the CD-ROM 46 or the compact disc 47 supported to rotate by the disc rotating table 45.

An information signal SR based on the road map information or the music information or the like read from the CD-ROM 46 or the compact disc 47 is obtained from the optical head 49 and supplied to an arithmetic processor 50. In the arithmetic processor 50, the information signal SR from the optical head 49 is subjected to a predetermined arithmetic processing to produce a digital information signal SX. The digital information signal SX from the arithmetic processor 50 is supplied to a decoder 51.

In the decoder 51, identification data T and control information data Q are reproduced on the basis of signal components contained in the digital information signal SX and either the map data DM representing the road map reproduced from the digital information signal SX when the digital information signal SX has been obtained from the information signal SR based on the road map information read from the CD-ROM 46 or audio data DA representing music or the like are reproduced from the digital information signal SX when the digital information signal SX has been obtained from the information signal SR based on the music information or the like read from the compact disc 47.

The identification data T reproduced an the basis of the signal component contained in the digital information signal SX in the decoder 51 are selected to be TOC data recorded on both the CD-ROM 46 and the compact disc 47 and contain data related to the CD-ROM 46 or the compact disc 47, with which a situation wherein the optical head 49 reads the road map information from the CD-ROM 46 is distinguished clearly from a situation wherein the optical head 49 reads the music information or the like from the compact disc 47. The control information data Q reproduced also on the basis of the signal component contained in the digital information signal SX in the decoder 51 contain reading address data representing a reading position (reading address) on the CO-ROM 46 or the compact disc 47 at which the road map information or the music information or the like are just read by the optical head 49 and other data.

The map data DM obtained from the decoder 51 are latched by a map data latching portion 52 and supplied from the map data latching portion 52 to the present position detecting unit 37 in the position detecting block 12 and the data processing block 14 under a predetermined condition. The audio data DA obtained from the decoder 51 are supplied to an audio signal reproducing portion 55. In the audio signal reproducing portion 55, the audio data DA are subjected to digital to analog conversion to produce an audio signal AX. This audio signal AX obtained from the audio signal reproducing portion 55 is supplied through the switch 32 and the audio amplifier 33 to the speaker 34 and a sound based on the audio signal AX is obtained from the speaker 34. That is, the data reproducing blocks 13 functions as disc player and thereby the sound based on the music information or the like read from the compact disc 47 by the optical head 49 is reproduced.

The identification data T obtained from the decoder 51 are supplied to a system controller 56 and the control information data Q obtained from the decoder 51 are supplied to the system controller 56 and a display data generator 57. The display data generator 57 produces display data DD representing the reading address on the compact disc 47 on the basis of the reading address data contained in the control information data Q which are obtained under the situation wherein the optical head 49 reads the music information or the like from the compact disc 47.

The system controller 56 is operative to perform comprehensive operation control to various portions in the data reproducing block 13 in such a manner as to control with a control signal C1 the operation of the motor 48, to control with a control signal C2 the position and the reading operation of the optical head 49, to control with a control signal C3 the operation of the map data latching portion 52 for latching the map data DM, to control with a control signal C4 the operation of the decoder 51, and to control with a control signal C5 the operation of the display data generator 57. With the operation control thus performed, fox example, the system controller 56 makes, in response to the identification data T from the decoder 51, the operation of the motor 48, the position and the reading operation of the optical head 49 and the operation of the decoder 51 suitable for the situation wherein the optical head 49 reads the road map information from the CD-ROM 46 or the situation wherein the optical head 49 reads the music information or the like from the compact disc 47.

The system controller 56 is also operative to form, in response to the identification data T from the decoder 51, the control signal C5 so as to correspond selectively to the situation wherein the optical head 49 reads the road map information from the CD-ROM 46 and to the situation wherein the optical head 49 reads the music information or the like from the compact disc 47. The control signal C5 thus formed by the system controller 56 is supplied to the display data generator 57 and thereby the display data generator 57 produces the display data DD based on the reading address data contained in the control information data Q from the decoder 51 and sends it out when the optical head 49 reads the music information or the like from the compact disc 47.

Further, the system controller 56 is operative to control, in response to the reading control signal CM from the present position detecting unit 37 in the position detecting block 12, the position of the optical head 49 for controlling the reading address on the CD-ROM 46 and the operation of the map data latching portion 52 for latching the map data DM under the situation wherein the optical head 49 reads the road map information from the CD-ROM 46. With such control by the system controller 56, the map data DM which are required by the reading control signal CM from the present position detecting unit 37 are derived from the map data latching portion 52 to both the present position detecting unit 37 and the data processing block 14. The system controller 56 supplies the present position detecting unit 37 with a control signal C6 during the control operation conducted in response to the reading control signal CM from the present position detecting unit 37.

In the data processing block 14, a route setting portion 60 is provided. The present position data DP from the present position detecting unit 37 in the position detecting block 12, the map data DM from the map data latching portion 52 in the data reproducing block 13, and the input position data Db from the data input portion 38 in the position detecting block 12 are supplied to the data processing block 14. In the route setting portion 60, under a condition wherein the input position data Db are treated as destination data representing a destination at which the automobile on which the embodiment is shown in FIG. 1 is equipped is to arrive, a travelling route to the destination represented by the input position data Db for the automobile is set on the road map represented by the map data DM successively in response to operations of the data input portion 38 and travelling route data DC representing the travelling route set on the road map represented by the map data DM are produced.

The travelling route data DC obtained from the route setting portion 60 are supplied to a data synthesizer 61. The present position data DP from the present position detecting unit 37 in the position detecting block 12 and the map data DM from the map data latching portion 52 in the data reproducing block 13 are also supplied to the data synthesizer 61 in addition to the travelling route data DC from the route setting portion 60. In the route setting portion 60, the present position data DP, the map date DM and the travelling route data DC are mixed with one another and thereby display data DN are synthesized.

In the video signal transmitting block 15, a video signal generator 62 to which the display data DD sent out of the display data generator 57 in the data reproducing block 13 and the display data DN sent out of the data synthesizer 61 in the data processing block 14 are supplied is provided. The supply of the display data DD from the display data generator 57 to the video signal transmitting block 15 is done in the case where the optical head 49 reads the music information or the like from the compact disc 47 and the supply of the display data DN from the data synthesizer 61 to the video signal transmitting block 15 is done in the case where the optical head 42 reads the road map information from the CD-ROM 46.

In the video signal generator 62, a video signal VX based on the display data DD is produced when the optical head 49 reads the music information or the like from the compact disc 47 and the display data DD from the display data generator 57 are supplied to the video signal generator 62. The video signal VX obtained from the video signal generator 62 is supplied through a signal adder 67 to the video and audio signal processing block 11. In the video and audio signal processing block 11, the video signal VX is supplied through the switch 27 and the output amplifier 28 to the image displaying cathode ray tube 29 and picture images based on the video signal VX are displayed on the image displaying screen 2 of the image displaying cathode ray tube 29 for showing the reading address on the compact disc 47. The signal adder 67 functions as a signal supplying portion to the video and audio signal processing block 11. During such an image displaying operation, the sound based on the audio signal AX obtained from the audio signal reproducing portion 55 in the data reproducing block 13 is reproduced by the speaker 34 in the video and audio signal processing block 11. The reading address on the compact disc 47 shown in the picture images displayed on the image displaying screen 2 of the image displaying cathode ray tube 29 is composed of, for example, a track number on the compact disc 47 and a time spent for reading the information from the compact disc 47.

Further, in the video signal generator 62, a video signal VN based on the display data DN, which represent the road map represented by the map data DM, the present position represented by the present position data DP and put over the road map, and the travelling route represented by the travelling route data DC and put over the road map, is produced when the optical head 49 reads the road map information from the CD-ROM 46 and the display data DN from the data synthesizer 61 are supplied to the video signal generator 62. The video signal VN obtained from the video signal generator 62 is also supplied through the signal adder 67 to the video and audio signal processing block 11. In the video and audio signal processing block 11, the video signal VN is supplied through the switch 27 and the output amplifier 28 to the image displaying cathode ray tube 29 and picture images based on the video signal VN are displayed oh the image displaying screen 2 of the image displaying cathode ray tube 29 for showing the read map, the present position put over the road map and the travelling route put over the road map. This means that images for navigation are displayed on the image displaying screen 2 under a condition wherein the position detecting block 12, the data reproducing block 13, the data processing block 14 and the video signal transmitting block 15 are operative as a whole to function as a navigation apparatus equipped on the automobile.

In the video signal transmitting block 15, a background data memory 63 in which background data DVP corresponding to the situation wherein the optical head 49 reads the music information or the like from the compact disc 47 and the video signal VX is obtained from the video signal generator 62 is stored and a background data memory 64 in which background data DVN corresponding to the situation wherein the optical head 49 reads the road map information from the CD-ROM 46 and the video signal VN is obtained from the video signal generator 62 is stored, are provided. The reading of the background data DVP from the background data memory 63 and the reading of the background data DVN from the background data memory 64 are controlled by a reading controller 65. The control signal C5 sent out of the system controller 56 is supplied to the reading controller 65. The reading controller 65 is operative to supply the background data memory 63 with a reading control signal CRP so that the background data DVP are read from the background data memory 63, in response to the control signal C5 which corresponds to the situation wherein the optical head 49 reads the music information or the like from the compact disc 47, and to supply the background data memory 64 with a reading control signal CRN so that the background data DVN are read from the background data memory 64, in response to the control signal C5 which corresponds to the situation wherein the optical head 49 reads the road map information from the CD-ROM 46. The background data DVP read from the background data memory 63 and the background data DVN read from the background data memory 64 are supplied to a background video signal generator 66.

Figure 3:
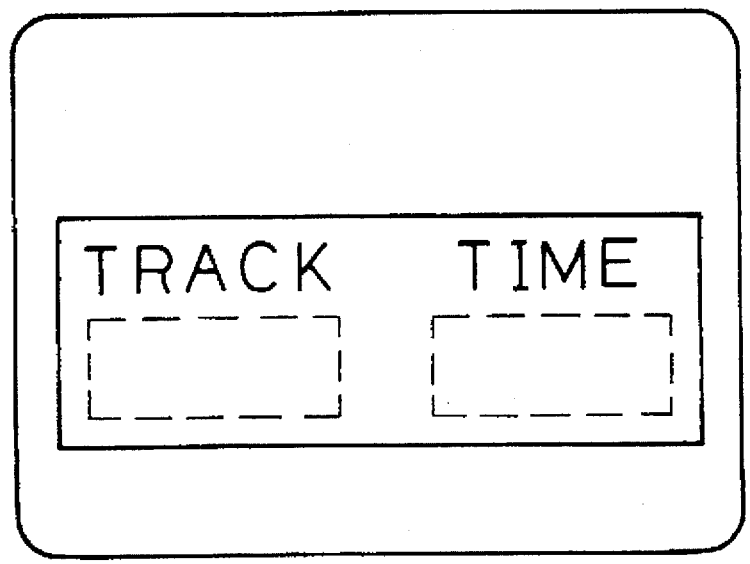
FIG. 3 and FIG. 4 are illustrations used for explaining picture images obtained by the embodiment shown in FIGS. 1, 2A and 2B.

In the background video signal generator 66, a background video signal VVP corresponding to the background data DVP is produced when the optical head 49 reads the music information or the like from the compact disc 47 and the background data DVP read from the background data memory 63 are supplied to the background video signal generator 66. The background video signal VVP obtained from the background video signal generator 66 is supplied through the signal adder 67 to the video and audio signal processing block 11 alone in advance of the video signal VX from the video signal generator 62 or together with the video signal VX. In the video and audio signal processing block 11, the background video signal VVP is supplied through the switch 27 and the output amplifier 28 to the image displaying cathode ray tube 29 and an initial picture image corresponding to the situation wherein the optical head 49 reads the music information or the like from the compact disc 47, for example, as shown in FIG. 3, is displayed on the image displaying screen 2 of the image displaying cathode ray tube 29 of the basis of the background video signal VVP. On the initial picture image shown in FIG. 3, "TRACK" and "TIME" show a track number on the compact disc 47 and a time spent for reading the information from the compact disc 47, both of which represent the reading address on the compact disc 47 displayed based on the video signal VX.

Figure 4:
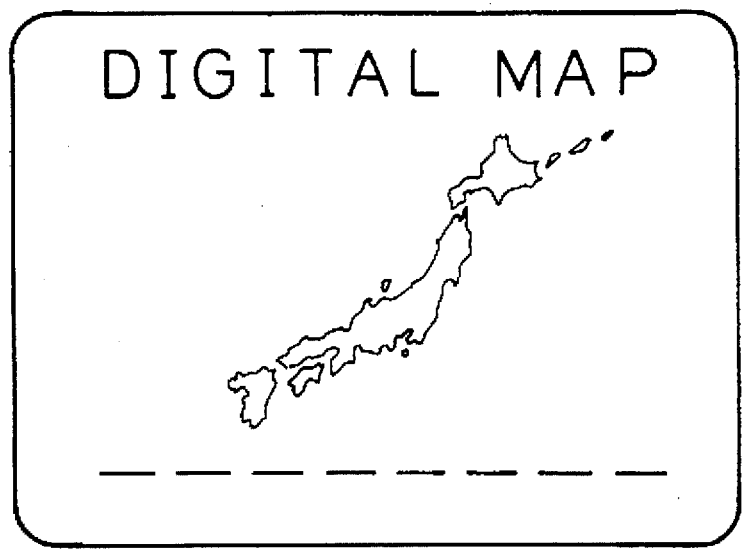

Further, in the background video signal generator 66, a background video signal VVN corresponding to the background data DVN produced when the optical head 49 reads the road map information from the CD-ROM 46 and the background data DVN are read out from the background data memory 64 supplied to the background video signal generator 66. The background video signal VVN obtained from the background video signal generator 66 is supplied through the signal adder 67 to the video and audio signal processing block 11 alone in advance of the video signal VN from the video signal generator 62 or together with the video signal VN. In the video and audio signal processing block 11, the background video signal VVN is supplied through the switch 27 and the output amplifier 28 to the image displaying cathode ray tube 29 and an initial picture image corresponding to the situation wherein the optical head 49 reads the road map information from the CD-ROM example, as shown in FIG. 4, is displayed on the image displaying screen 2 of the image displaying cathode ray tube 29 on the basis of the background video signal VVN.

In such a manner as mentioned above, the initial picture image which is displayed on the image displaying screen 2 of the image displaying cathode ray tube 29 with a background image based on the background video signal VVP when the optical head 49 reads the music information or the like from the compact disc 47 and the initial picture image which is displayed on the image displaying screen 2 of the image displaying cathode ray tube 29 with a background image based on the background video signal VVN when the optical head 49 reads the road map information from the CD-ROM 46, are remarkably different from each other, for example, in image pattern and color. Accordingly, the picture images including the initial picture image which is displayed by the image displaying cathode ray tube 29 in the video and audio signal processing block 11 when the data reproducing block 13 is operative to function as the disc player and the optical head 49 reads the music information or the like from the compact disc 47 so that the condition of reproduction of the audio data DA is displayed with the reading address on the compact disc 47 based on the video signal VX by the image displaying cathode ray tube 29 are provided with remarkable self-identity, and the picture images including the initial picture image which is displayed by the image displaying cathode ray tube 29 in the video and audio signal processing block 11 when the position detecting block 12, the data reproducing block 13, the data processing block 13 and the video signal transmitting block 15 are operative as a whole to function as the navigation apparatus equipped on the automobile and the optical head 49 reads the road map information from the CD-ROM 46 so that the images for navigation based on the video signal VN are displayed by the image displaying cathode ray tube 29 are also provided with remarkable self-identity. Consequently, the initial picture image obtained on the image displaying cathode ray tube 29 are in the video and audio signal processing block 11 while the embodiment shown in FIG. 1 functions as the disc player is distinguished quite obviously from the initial picture image obtained on the image displaying cathode ray tube 29 in the video and audio signal processing block 11 when the embodiment shown in FIG. 1 functions as the navigation apparatus equipped on the automobile.

The operating block 17 connected to the control unit 16 includes the manual control portions 6, 7 and 8 and supplies the control unit 16 with operation control signals CKG which are obtained in response to manipulations on the control buttons included in the manual control portions 6, 7 and 8.

The control unit 16 is operative to supply the power source 18 with a control signal CB for controlling the operation of the power source 18 and to supply the switch 19 with a control signal CS for causing the switch 19 to be selectively in its ON state and in its OFF state.

The control unit 16 is further operative to supply the video and audio signal processing block 11 with a control signal CT, the position detecting block 12 with a control signal CG, the data reproducing block 13 with a control signal CP, the data processing block 14 with a control signal CN, and the video signal transmitting block 15 with a control signal CV for controlling the operation of each of the video and audio signal processing block 11, the position detecting block 12, the data reproducing block 13, the data processing block 14 and the video signal transmitting block 15. Each of the control signals CT, CG, CP, CN and CV includes a plurality of control signal components.

The control unit 16 is still further operative to supply the switches 27 and 32 in the video and audio signal processing block 11 with control signals CWV and CWA, respectively, for causing the switch 27 to supply the output amplifier 28 selectively with the modified video signal VC from the video signal processor 26 and with the background video signal VVP or VVN and the video signal VX or VN from the signal adder 67 and for causing the switch 32 to supply the audio amplifier 33 selectively with the audio signal AU from the sound detector 31 and with the audio signal AX from the audio signal reproducing portion 55 in the data reproducing block 13.

The control signal C5 sent out of the system controller 56 in the data reproducing block 13 is also supplied to the operating block 17. In the operating block 17, one or more of the operation control signals CKG supplied to the control unit 16 in response to the manipulations on a specific one or more of the control buttons included in the manual control portions 6, 7 and 8 are changed in contents thereof between the case where the control signal C5 corresponds to the situation wherein the optical head 49 reads the music information or the like from the compact disc 47 and the case where the control signal C5 corresponds to the situation wherein the optical head 49 reads the road map information from the CD-ROM 46.

When the specific one or more of the control buttons included in the manual control portions 6, 7 and 8 are manipulated for controlling at least the operations of the video and audio signal processing block 11 and the data reproducing block 13 under a condition in which the control signal C5 corresponds to the situation wherein the optical head 49 reads the music information or the like from the compact disc 47, one or more of the operation control signals CKG which are formed for causing the control unit 16 to control properly the operations of the video and audio signal processing block 11 and the data reproducing block 13 under the condition in which the data reproducing block 13 is operative to function as the disc player are supplied from the operating block 17 to the control unit 16. When the specific one or more of the control buttons included in the manual control portions 6, 7 and 8 are manipulated for controlling at least the operations of the video and audio signal processing block 11 and the data reproducing block 13 under a condition in which the control signal C5 corresponds to the situation wherein the optical head 49 reads the road map information from the CD-ROM 46, one or more of the operation control signals CKG which are formed for causing the control unit 15 control properly the operations of the video and audio signal processing block 11 and the data reproducing block 13 under the condition in which the position detecting block 12, the data reproducing block 13, the data processing block 14 and the video signal transmitting block 15 are operative as a whole to function as the navigation apparatus equipped on the automobile are supplied from operating block 17 to the control unit 16.

Accordingly, when the specific one or more of the control buttons included in the manual control portions 6, 7 and 8 are manipulated for controlling at least the operations of the video and audio signal processing block 11 and the data reproducing block 13, the manner of operation control by the control unit 15 to the video audio signal processing block 11 and the data reproducing block 13 is changed in response to the contents of the identification data reproduced by the data reproducing block 13.

When the video signal VD and the audio signal AU which are obtained on the basis of the television broadcast signal SV received by the television antenna 4 and selected by the tuner 22 are applied to image display by the image displaying cathode ray tube 29 and sound reproduction by the speaker 34, respectively, in the video and audio signal processing block 11, the switch 27 in the video and audio signal processing block 11 is controlled by the control unit 16 to supply the output amplifier 28 with the modified video signal VC from the video signal processor 26 and the switch 32 in the video and audio signal processing block 11 is controlled by the control unit 16 to supply the audio amplifier 33 with the audio signal AU from the sound detector 31. In this case, the switch 19 is controlled by the control unit 16 to keep its OFF state for cutting the voltage supplying line from the power source 18 off. Thereby, although each of the video and audio signal processing block 11 and the position detecting block 12 is supplied with the power supply voltage VB from the power source 18 to be operative, each of the data producing block 13, the data processing block 14 and the video signal transmitting block 15 is not supplied with the power supply voltage VB from the power source 18 and kept inoperative.

Under such a condition, the digital circuits constituting the arithmetic processor 50 and the decoder 51 in the data reproducing block 13 and the digital circuits constituting the route setting portion 60 and the data synthesizer 61 in the data processing block 14 are kept inoperative not to produce clock signals and therefore no signal which is generated by the digital circuits in both the data reproducing block 13 and the data processing block 14 to mix as noises with the video signal VD or the audio signal AU in the video and audio signal processing block 11 propagates radiately. Consequently, the images displayed by the image displaying cathode ray tube 29 on the basis of the video signal VD and the sound reproduced by the speaker 34 on the basis of the audio signal AU in the video and audio signal processing block 11 are surely prevented from being disturbed by noises.

Since the position detecting block 12 is kept operative, the images for navigation are quickly obtained on the image display screen 2 of the image displaying cathode ray tube 29 when the situation wherein the video signal VD and the audio signal AU which are obtained on the basis of the television broadcast signal SV received by the television antenna 4 and selected by the tuner 22 are applied to image display by the image displaying cathode ray tube 29 and sound reproduction by the speaker 34, respectively, in the video and audio signal processing block 11 is switched to the situation wherein the position detecting block 12, the data reproducing block 13, the data processing block 14 and the video signal transmitting block 15 are operative as a whole to function as the navigation apparatus equipped on the automobile. Incidentally, it is easy to form the position detecting block 12 in relatively small size to be put in an effectively shielded condition and therefore there is no fear that a signal generated by the position detecting block 12 propagates to mix as noises with the video signal VD or the audio signal AU in the video and audio signal processing block 11.

When the data reproducing block 13 is operative to function as the disc player and the sound is reproduced by the speaker 34 in the video and audio signal processing block 11 on the basis of the music information or the like read by the optical head 49 from the compact disc 47 in the data reproducing block 13, the switch 27 in the video and audio signal processing block 11 is controlled by the control unit 16 to supply the output amplifier 28 with the background video signal VVP and the video signal VX from the signal adder 67 in the video signal transmitting block 15 and the switch 32 in the video and audio signal processing block 11 is controlled by the control unit 16 to supply the audio amplifier 33 with the audio signal AX from the audio signal producing portion 55 in the data reproducing block 13. Further, in this case, the switch 19 is controlled by the control unit 16 to keep its ON state and thereby each of the video and audio signal processing block 11, the position detecting block 12, the data reproducing block 13, the data processing block 14 and the video signal transmitting block 15 is supplied with the power supply voltage VB from the power source 18 and kept operative stably.

When the position detecting block 12, the data reproducing block 13, the data processing block 14 and the video signal transmitting block 15 are operative as a whole to function as the navigation apparatus equipped on the automobile and the images for navigation are displayed on the image display screen 2 of the image displaying cathode ray tube 29 in the video and audio signal processing block 11, the switch 27 in the video and audio signal processing block 11 is controlled by the control unit 16 to supply the output amplifier 28 with the background video signal VVN and the video signal VN from the signal adder 67 in the video signal transmitting block 15. In this case also, the switch 19 is controlled by the control unit 16 to keep its ON state and thereby each of the video and audio signal processing block 11, the position detecting block 12, the data reproducing block 13, the data processing block 14 and the video signal transmitting block 15 is supplied with the power supply voltage VB from the power source 18 and kept operative stably.

Although, in the video and audio signal processing block 11 employed in the embodiment described above, the video signal VD and the audio signal AU which are obtained on the basis of the television broadcast signal SV received by the television antenna 4 and selected by the tuner 22 are applied to image display by the image displaying cathode ray tube 29 and sound reproduction by the speaker 34, respectively, it is possible and easy to arrange the video and audio signal processing block 11 so as to have external signal input terminals through which video and audio signals obtained from, for example, a video tape recorder (VTR) and to apply the video and audio signals supplied through the external signal input terminals to image display by the image displaying cathode ray tube 29 and sound reproduction by the speaker 34, respectively.

Figure 5:
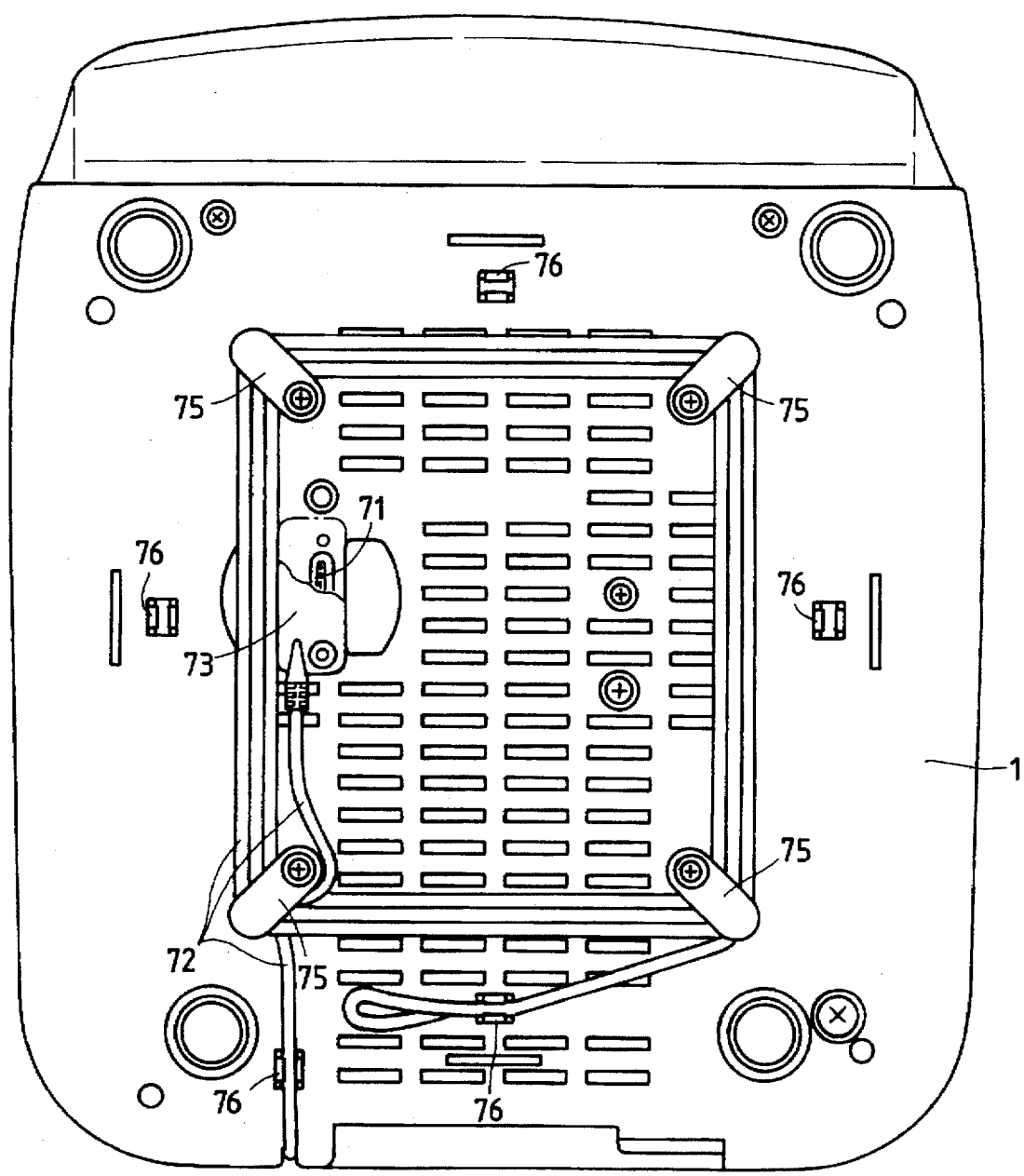
FIG. 5 is a plane view showing a bottom portion of a cabinet employed in the embodiment shown in FIG. 1.

As shown in FIG. 5, at the bottom of the cabinet 1 shown in FIG. 1, a connector 71 for connecting electrically the GPS signal receiving block 5 with the present position detecting unit 37 in the position detecting block 12 and a connector 73 provided at the end of a connecting cord 72 which extends from the GPS signal receiving block 5 is coupled with the connector 71. The connector 73 coupled with the connector 71 is fixed, for example, by screws to the bottom of the cabinet 1. Four hoof members 75 are also provided at the bottom of the cabinet 1 as shown in FIG. 5 to form a cord holder and the connecting cord 72 extending from the GPS signal receiving block 5 and having the connector 73 coupled with the connector 71 is wound around the hook members 75. A plurality of cord clampers 76 each has a pair of projections between which the connecting cord 72 is put to be fixed are further provided around the code holder composed of the hook members 75.

Figure 6:
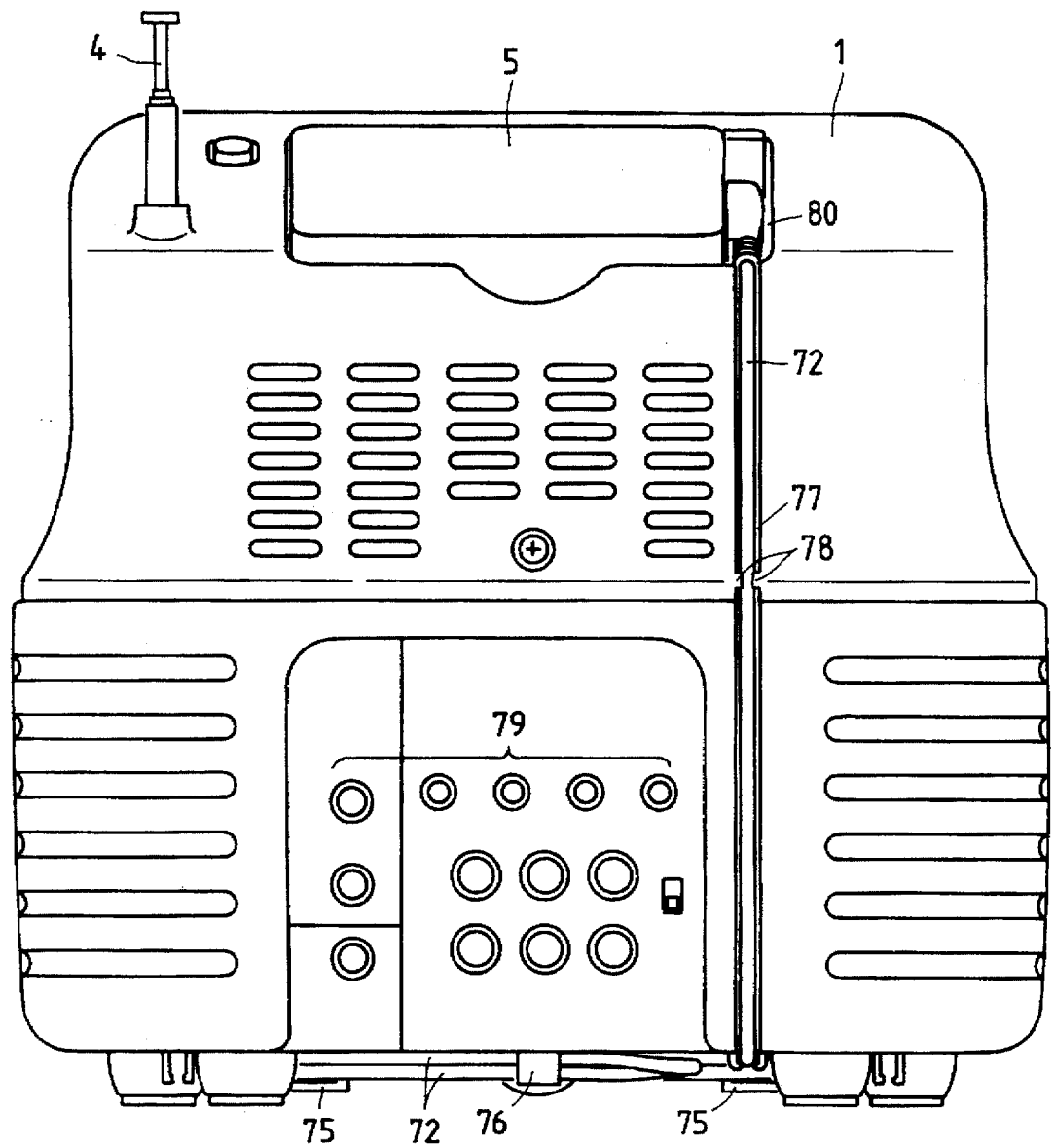
FIG. 6 is a plane view showing a rear portion of a cabinet employed in the embodiment shown in FIG. 1.

As shown in FIG. 6, on the back of the cabinet 1, a guiding groove 77 extending vertically from a portion of the top of the cabinet 1 by which the GPS signal receiving block 5 is supported to the bottom of the cabinet 1 is provided for receiving the connecting cord 72 put therein. This guiding groove 77 functions to guide the connecting cord 72 extending from the GPS signal receiving block 5 which is supported by the portion of the top of the cabinet 1 to the bottom of the cabinet 1. An engaging portion 78 is formed in the guiding groove 77 to prevent the connecting cord 72 put in the guide groove 77 from coming out. A plurality of connectors 79 are also provided on the back of the cabinet 1 to be selectively connected with external electronic apparatus.

With such a structure, as shown in FIGS. 5 and 6, the connecting cord 72, which extends from the GPS signal receiving block 5 held by the portion of the top of the cabinet 1 and has the connector 73 provided at its end and coupled with the connector 71 provided at the bottom of the cabinet 1, is guided from the GPS signal receiving block 5 through the guiding groove 77 provided on the back of the cabinet 1 to the bottom of the cabinet 1 to be wound around the hook members 75 forming the cord holder and fixed by the cord clampers 76. Consequently, the GPS signal receiving block 5 which is supported by the portion of the top of the cabinet 1 as shown in FIGS. 1 and 6 and the connecting cord 72 extending the GPS signal receiving block 5 do not become obstacles to carry the embodiment shown in FIG. 1 and the appearance of the embodiment shown in FIG. 1 is kept excellent.

Figure 7:
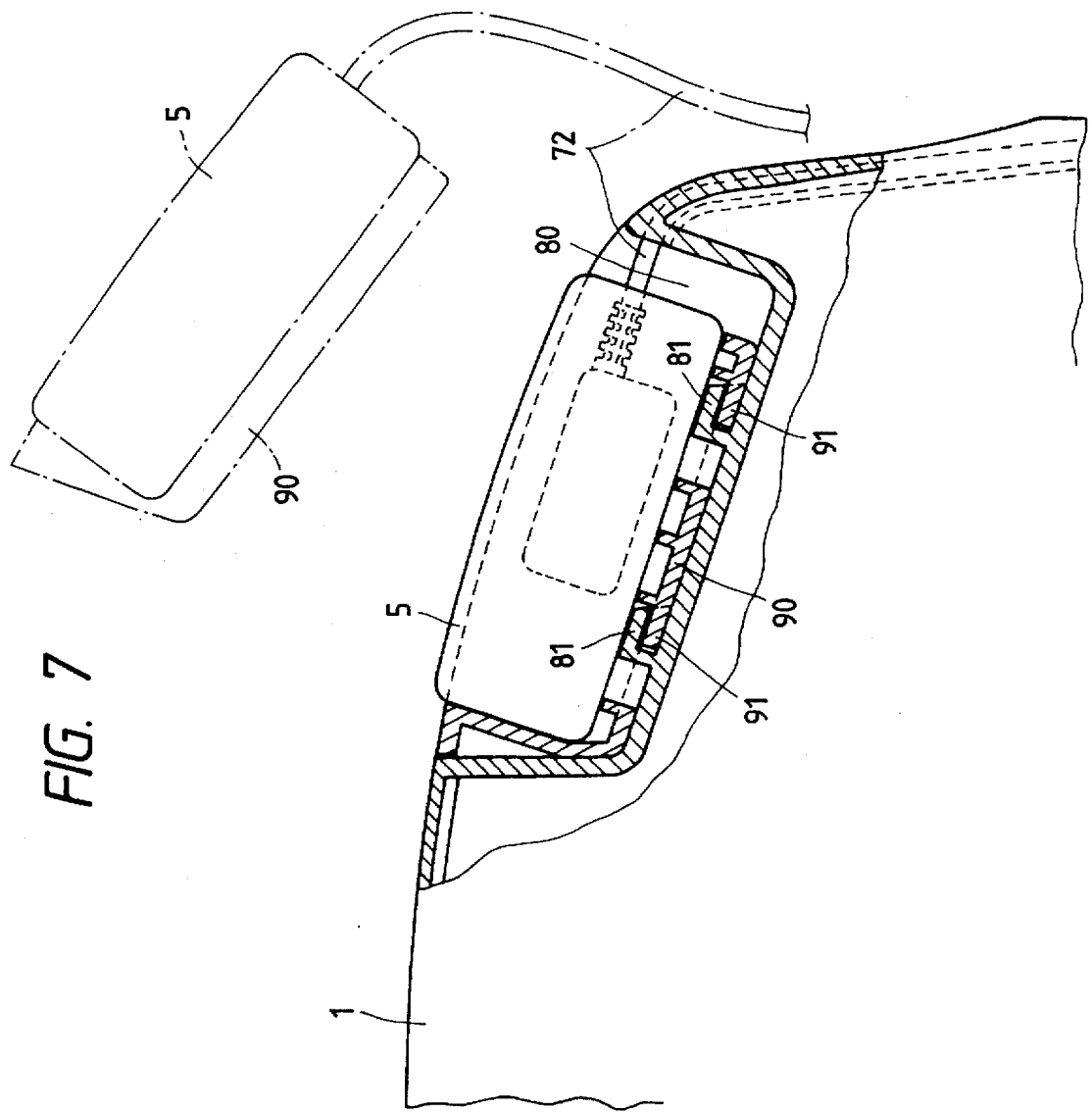
FIG. 7 is a cross-sectional view showing a part of the embodiment shown in FIG. 1.

As shown in FIGS. 1, 6 and 7, a recess 80 in which the GPS signal receiving block 5 is placed is provided at the portion of the top of the cabinet 1 by which the GPS signal receiving block 5 is supported The recess 80 has a plurality of hook 81 at its bottom. The GPS signal receiving block 5 is provided with an attachment member 90 fixed to its lower portion and the attachment member 90 has a plurality of engaging portions 91 for engaging with the hooks 81 provided at the bottom of the recess 80.

When the GPS signal receiving block 5 is placed in the recess 80, as shown with solid lines in FIG. 1, the engaging portions 91 of the attachment member 90 fixed to the GPS signal receiving block 5 are caused to engage with the corresponding hooks 81 provided at the bottom of the recess 80, respectively, to be held in the recess 90. When the GPS signal receiving block 5 is taken out of the recess 80, as shown with dot-dash lines in FIG. 7, the engaging portions. 91 of the attachment member 90 fixed to the GPS signal receiving block 5 are moved in the recess 80 to disengage with the corresponding hooks 81 provided at the bottom of the recess 80 previously and then the GPS signal receiving block 5 is removed from the recess 80 to be placed at the outside of the cabinet 1. The connecting cord 72 extending from the GPS signal receiving block 5 is caused to come out of the guide groove 77 provided on the back of the cabinet 1 and to disengage with the cord clampers 76 provided at the bottom of the cabinet 1 and loosed from the hook members 75 provided at the bottom of the cabinet 1 to form the cord holder when the GPS signal receiving block 5 is taken out of the recess 80 provided at the portion of the top of the cabinet 1.

What is claimed is:

1. A composite electronic apparatus comprising:

a video and audio signal processing portion including image displaying means for displaying images based on a video signal and sound reproducing means for reproducing sounds based on an audio signal, a position detecting portion including antenna means for receiving a positional information signal from a satellite, positional information signal processing means for processing the positional information signal and generating an output signal, and detecting means to detect a position based on said output signal from said positional information signal processing means and to generate position data representing said position, a data reproducing portion for reading recorded information from a record medium and for forming an information signal representing the information read from the record medium and for reproducing said information signal into one of a map data or an audio data based on the information signal, a data processing portion for processing the position data generated by said position detecting portion with the map data reproduced by said data reproducing portion, a video signal transmitting portion for producing a video signal for image display on the basis of the position data from said data processing portion and the map data from said data reproducing portion and transmitting the video signal for image display to the image displaying means in said video and audio signal processing portion, and a cabinet for enclosing and supporting said video and audio signal processing portion, said position detecting portion, said data reproducing portion, said data processing portion and said video signal transmitting portion, wherein said data reproducing portion is further used to obtain a reproduced audio signal based on the audio data reproduced from the information signal and supplied to the sound reproducing means in said video and audio signal processing portion for causing the sound reproducing means to reproduce a sound based on the reproduced audio signal.

2. A composite electronic apparatus according to claim 1, wherein said data reproducing portion is a disc player for rotating a disc-shaped recording medium and reading information from the disc-shaped recording medium forming said information signal.

3. A composite electronic apparatus according to claim 1, wherein said video and audio signal processing portion is a television receiver to receive a television broadcast signal, to produce video and audio signals based on the basis of received television broadcast signal, to display images based on said video signal and to reproduce a sound based on said audio signal.

4. A composite electronic apparatus according to claim 1, wherein the antenna means of the positional information signal processing means in said position detecting portion are contained in a separate block supported by a portion of said cabinet.

5. A composite electronic apparatus according to claim 4, wherein said separate block is datachably supported to said cabinet.

6. A composite electronic apparatus according to claim 5, wherein said cabinet has a connector for connecting electrically the separate block with the detecting means in said position detecting portion.

7. A composite electronic apparatus according to claim 6, wherein said cabinet is provided with a cord holder around which a connecting cord for connecting said connector with the separate block is held.

8. A composite electronic apparatus according to claim 7, wherein said cabinet is provided further with a cord clamper for clamping the connecting cord.

9. A composite electronic apparatus according to claim 7, wherein said cabinet has a guide groove for guiding the connecting cord.

10. A composite electronic apparatus according to claim 9, wherein said guide groove is provided with an engaging portion for engaging the connecting cord to said cabinet.

11. A composite electronic apparatus comprising:

a video and audio signal processing portion including image displaying means for displaying images based on a video signal and sound reproducing means for reproducing sounds based on an audio signal, a position detecting portion for conducting positional detection to produce position data representing a detected position, a data reproducing portion for reading recorded information from a record medium and for forming an information signal representing the information read from the record medium, and for reproducing identification data, control information data and one of map data representing map information and audio data based on the information signal, and for producing a first display data on the basis of the control information data under a predetermined condition, a data processing portion for processing the position data obtained from said position detecting portion with the map data obtained from said data reproducing portion so as to produce a second display data, video signal generating means for generating one of a first video signal based on the first display data obtained from said data reproducing portion and a second video signal based on the second display data obtained from said data processing portion, background video signal generating means for generating first and second different background video signals in response to the identification data fed from said data reproducing portion to said background video signal generating means, and signal supplying means for supplying the image displaying means in said video and audio signal processing portion with one of the first and second background video signals obtained from said background video signal generating means alone or together with one of the first and second video signals.

12. A composite electronic apparatus according to claim 11, wherein said background video signal generating means includes data memory means in which a first background data corresponding to the first condition in which the first video signal is obtained from said video signal generating means and second background data corresponding to the second condition in which the second video signal is obtained from said video signal generating means are stored and is used to produce selectively a background video signal based on said first background data and a background video signal based on said second background data in response to contents of the identification data obtained in said data reproducing portion.

13. A composite electronic apparatus according to claim 12, wherein said background video signal generating means includes first background data memory means in which first background data corresponding to the first condition in which the first video signal is obtained from said video signal generating means is stored, second background data memory means in which second background data corresponding to the second condition in which the second video signal is obtained from said video signal generating means is stored, reading control means for controlling selectively the first background data memory means so that the first background data is read from the first background data memory means and the second background data memory means so that the second background data is read from the second background data memory means in response to contents of the identification data obtained in said data reproducing portion, and background video signal generating means for producing selectively the background video signal based on the first background data read from said first background data memory means and the background video signal based on the second background data read from said second background data memory means.

14. A composite electronic apparatus according to claim 12 further comprising an operating block for controlling the operations of said video and audio signal processing portion and said data reproducing portion and to control each of said video and audio signal processing portion and said data reproducing portion in response to contents of the identification data obtained from said data reproducing portion.

15. A composite electronic apparatus according to claim 11, wherein said video and audio signal processing portion is a television receiver for producing the video and audio signals based on a received television broadcast signal and for displaying images based on said video signal and to reproduce a sound based on said audio signal.

16. A composite electronic apparatus according to claim 11, wherein said position detecting portion is used to receive a positional information signal from a satellite and for detecting a position on the basis of said positional information signal.

17. A composite electronic apparatus according to claim 11, wherein said data reproducing portion is a disc player for rotating a disc-shaped recorded medium and reading information from the disc-shaped recorded medium rotated to form an information signal representing the information read from the disc-shaped recorded medium.

18. A composite electronic apparatus comprising:

a video and audio signal processing portion for displaying images based on a video signal and for reproducing sounds based on an audio signal, a position detecting portion for conducting positional detection to produce position data representing a detected position, a data reproducing portion for reading recorded information from a record medium and for forming an information signal representing the information read from the record medium, and to cause the information signal to be digitally processed to reproduce one of map data representing map information and audio data, a data processing portion for digitally processing the position data generated by said position detecting portion and the map data obtained from said data reproducing portion, power source means including a controllable switch for providing a power supply voltage directly to said position detecting portion and providing the power supply voltage through said controllable switch to a video and transmitting portion, to said data reproducing portion and to said data processing portion, and power supply control means for controlling said controllable switch to be open to prevent the power supply voltage from said power source means from being supplied to said data reproducing portion and said data processing portion when said video and audio signal processing portion is supplied with the power supply voltage to display images based on an external video signal and reproduce sounds based on an external audio signal.

19. A composite electronic apparatus according to claim 18, wherein said video and audio signal processing portion causes one of the external video and audio signals to be applied to an image display and a sound reproduction system, or to cause the video data and the audio data reproduced by said data reproducing portion to be applied to the image display and the sound reproduction system, or to cause the data subjected to digital processing in said data processing portion to be applied to the image display.

20. A composite electronic apparatus according to claim 18, wherein said video and audio signal processing portion is a television receiver to receive a television broadcast signal, to produce video and audio signals based on the basis of received television broadcast signal, to display images based on said video signal and to reproduce a sound based on said audio signal.

21. A composite electronic apparatus according to claim 18, wherein said position detecting portion receives a positional information signal from a satellite for conducting positional detection on the basis of said positional information signal.

22. A composite electronic apparatus according to claim 18, wherein said data reproducing portion is a disc player for rotating a disc-shaped recorded medium and reading information from the disc-shaped recorded medium rotated to form an information signal representing the information read from the disc-shaped recorded medium.

* * * * *